United States Patent
Simon et al.

[15] 3,650,775
[45] Mar. 21, 1972

[54] PLASTIC BAG FOR PACKAGING FRESH RED MEAT AND METHOD FOR MAKING THE SAME

[72] Inventors: Selwyn Simon, Glencoe; Donatas Tijunelis, Chicago, both of Ill.

[73] Assignee: Union Carbide Corporation

[22] Filed: July 24, 1968

[21] Appl. No.: 747,353

[52] U.S. Cl. ..............................99/174, 161/252, 200/46 F
[51] Int. Cl. ...........................................................B65b 25/06
[58] Field of Search ..................99/174, 171; 206/46; 53/28, 53/30; 229/2.5, 3.5; 161/166, 149, 252, 254

[56] References Cited

UNITED STATES PATENTS

| | | | |
|---|---|---|---|
| 2,354,590 | 7/1944 | Gilfillan | 229/3.5 X |
| 3,017,729 | 1/1962 | Cheeley | 229/DIG. 12 |
| 3,294,621 | 12/1966 | Baird | 161/252 X |
| 3,491,935 | 1/1970 | Trotter | 229/3.5 |
| 3,496,061 | 2/1970 | Freshour | 161/252 X |
| 3,502,486 | 3/1970 | Lundquist | 99/174 X |
| 2,634,459 | 4/1953 | Irons | 206/59 UX |
| 2,676,943 | 4/1954 | Carson | 96/174 X |
| 2,679,969 | 6/1954 | Richter | 229/3.5 |
| 2,834,686 | 5/1958 | Reuman | 99/174 X |
| 3,010,262 | 11/1961 | Rumsey | 99/174 UX |
| 3,029,149 | 4/1962 | De Long | 99/174 |
| 3,137,580 | 6/1964 | Sloan | 99/174 X |
| 3,161,999 | 12/1964 | Klusmire | 99/171 UX |
| 3,222,210 | 12/1965 | Hammond | 99/174 UX |
| 3,397,068 | 8/1968 | Schaefer | 99/174 |
| 3,496,696 | 2/1970 | Wiley | 99/171 X |

Primary Examiner—Tim R. Miles
Assistant Examiner—Robert Halper
Attorney—Paul A. Rose, John F. Hohmann and Franklyn Shoenberg

[57] ABSTRACT

A film bag for packaging fresh red meats is formed of two dissimilar films one of which has good oxygen transmitting properties but a tendency to "block" to itself, the other of which is non-blocking. Either or both of the films may be shrinkable. The films may be supplied in kit form for the making of bags by the meat packer.

26 Claims, 2 Drawing Figures

INVENTORS
SELWYN SIMON
DONATAS TIJUNELIS

3,650,775

PLASTIC BAG FOR PACKAGING FRESH RED MEAT AND METHOD FOR MAKING THE SAME

This invention relates to a plastic film bag for packaging fresh meats therein and to a kit and methods for producing the same. More particularly, this invention relates to a method for producing a composite plastic film bag by joining together two different plastic films, each exhibiting distinct properties and characteristics, and to the composite plastic film bag obtained therefrom.

Packages of fresh red meats desirably should be such that the meat retains its bright red appearance during its storage period. Plastic films used extensively today for wrapping fresh red meats for display have characteristics of good clarity, non-fogging, softness, good elasticity and have a high oxygen transmission rate. Retention of the desired red meat color of fresh meats packaged in plastic film is dependent upon the oxygen transmission rate of the plastic film in contact with the meat surface. It has been found that a minimum oxygen transmission rate of at least 140 cc./100 sq. in./24 hrs./atmos. at 32° F. is needed through any portion of the oxygen transmitting film of the package to insure retention of the red meat color for a reasonable period of time.

Plastic films which exhibit these desired characteristics are commercially available and are generally fabricated from polyvinyl chloride resins. These plastic films are presently used in the form of sheets to wrap and package fresh meats. Generally, the fresh meats are placed on a rigid support, such as a pulp or plastic tray, and are overwrapped with a sheet of plastic film. The overwrapped sheet is then gathered beneath the tray and sealed, usually by heat. Where no support is used, the plastic film sheet is merely wrapped about the meat item, gathered and then sealed by itself beneath the meat item.

These wrapping operations are generally performed either by automatic apparatus or by hand or by a combination of both. In any event, the operations are complex, costly and time-consuming. Additionally, these packaging and wrapping techniques often produce loose and unsightly packages. In some instances, the natural juices and moisture present in the fresh meat items may leak from the package due to the nature of wrapping and mode of sealing.

Attempts to minimize the problems of wrapping fresh red meat by providing bags of polyvinyl chloride film into which the meat could be inserted have been unsuccessful. Although the bags formed had good sealing about three of the four edges of the bags, they could not be readily opened for insertion of the product, due to the excessive blocking mature of the like polyvinyl chloride films.

It is an object of this invention, therefore, to provide a plastic film bag which can be utilized in the packaging of fresh red meats.

Another object is to provide a plastic film bag which exhibits the characteristics and properties desired for packaging fresh red meats therein.

Another object of the invention is the provision of a kit of films which can be fabricated by a meat packer into a bag for packaging fresh red meat.

These and other objects of the invention will become more apparent in light of the following description and the accompanying drawing in which.

Figure 1:
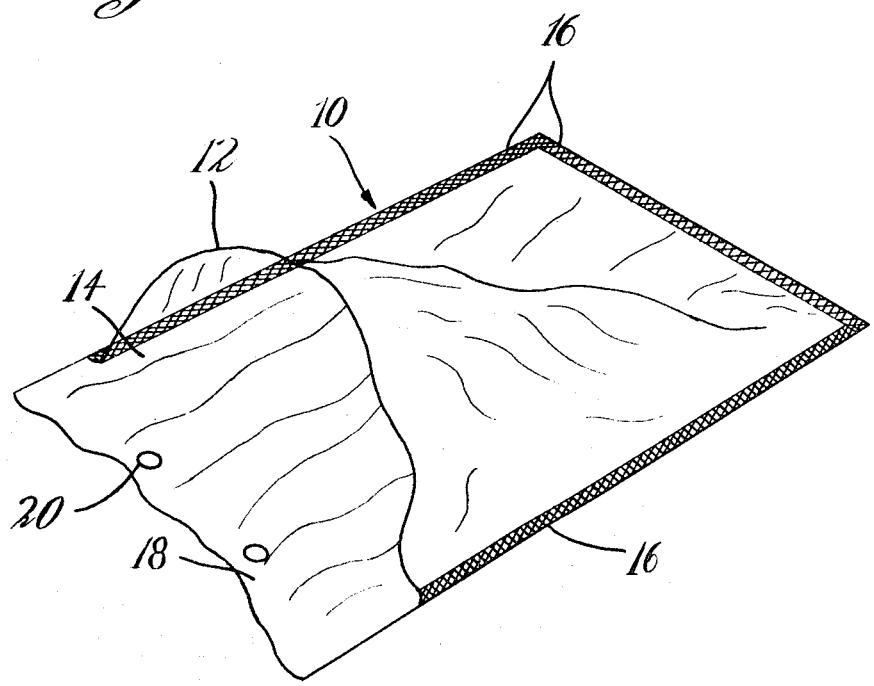
FIG. 1 is a perspective view of a bag embodying the invention.

The invention comprises a composite plastic film bag fabricated from a pair of films of dissimilar properties. One of the pair of films in the finished package is clear and transparent and has a minimum oxygen transmission rate of about 140 cc./100 sq.in./24 hr./atmosphere measured at 32° F. and characterized by its tendency to cling or block to itself. The other of the pair of films is nonblocking to the first of the pair and need not have the high oxygen transmission rate of the first. The invention also comprises a kit of such films adapted to be fabricated by a meat packer to produce a bag of the type discussed containing fresh red meat packaged therein. Also included in the invention are methods for producing packages of fresh red meat and the packages thus produced.

As just indicated, the plastic film bag of the invention is obtained by joining together two plies of plastic film, each ply having properties preselected to complement the other ply, to form a bag of composite construction, thereby rendering it readily distinguishable from other plastic film bags which are generally fabricated from integral tubular films.

In a specific embodiment of this invention, there is provided a bag for packaging red meat comprising a top ply and a bottom ply of vinyl films sealed together into an open end pouch capable of having the plies parted at the open end of the pouch by a gaseous jet; wherein the bottom ply is characterized by being heat-shrinkable and the top ply is characterized by being clearly transparent, non-fogging and having an oxygen transmission rate suitable for fresh red meat and further characterized by being substantially dimensionally stable at the temperature that the bottom ply is heat-shrinkable.

Present, preferred commercial operations for packaging fresh red meats on a rigid support such as a pulp or plastic tray, by overwrapping with plastic films require that the films exhibit the characteristics of a high oxygen transmission rate, clarity, softness or pliancy and also be non-fogging. To provide a plastic film bag for packaging fresh meats, therefore, only one side, the upper or top side, need exhibit all these characteristics while the other side, the lower or bottom side, may be less clear, less pliant or stiffer than the top ply.

Preferably, the top ply should exhibit dimensional stability at all temperatures to which it is normally subjected. It must have, in the finished package, an oxygen transmission rate sufficient to retain the red color of the fresh meats packaged therein. It will be understood that the plastic film to be used as the top ply of the composite bag can possess some shrink at the maximum temperature to which the composite bag is to be subjected, or it can be stretched somewhat to accommodate the meat, provided that after being shrunk or stretched, it will still possess at least the minimum oxygen transmission rate required to retain the fresh red meat color of the packaged meat. The plastic film employed as the bottom ply is non-blocking to the top ply. Preferably it is heat-shrinkable to a greater degree than the top ply so as to produce a product-conforming package when the packaged product is subjected to a shrink activating temperature.

With reference to FIG. 1 of the drawing, the composite bag shown generally at 10 has a top film ply 12 and a bottom film ply 14 joined to each other about three sides of their superimposed perimeters, as indicated by reference numeral 16, thereby providing and defining an opening at one end thereof. As shown in the drawing, the bottom ply 14 can be fabricated to provide a lip portion 18 that extends beyond the edge of the end of the top ply 12 at the open end of the composite bag 10 to further facilitate opening the composite bag. A number of apertures 20 may be provided in the lip portion 18 to permit hanging the bag on a rack.

The bag of the construction shown in FIG. 1 may be used for packaging fresh red meat in conventional manner, for example the mouth of the bag may be opened by directing a blast of air into it and then the meat product to be packaged may be inserted into the bag, the meat product being supported by a tray as shown and described in U.S. Pat. No. 3,138,907 and U.S. Pat. No. 3,161,211. The mouth of the bag now containing the meat product may now be closed by flattening and heat sealing it while it is under tension as described for example in U.S. Pat. No. 3,309,837, Faust, et al. If a shrink film is used as one of the plies of the bag, the sealed bag is heat shrunk about the meat product by passing it through a heated chamber as is well known in the art. If the bag is made utilizing an elastic film, it may be opened, stretched and a tray-supported meat product inserted therein as described in U.S. Pat. No. 2,884,328. Heat sealing may be accomplished as described.

Composite bags having other forms, shapes and configurations than that shown in the drawing to provide product conforming shapes, can readily be formed and fabricated by those skilled in the art.

In a preferred embodiment of the invention, a polyvinyl chloride homopolymer or copolymer resin (referred to herein as polyvinyl chloride polymers) is employed to obtain the plastic films for use as both the top and bottom plies of the composite bag. The resin formulation from which the top or upper ply is produced is modified to contain a sufficient amount of additives to make the film oxygen-permeable, clear, non-fogging and pliant while the resin formulation from which the bottom or lower ply is produced is modified to contain a sufficient amount of nonblocking or slip additives to prevent the two plies from sticking to each other, and is fabricated to impart shrinkage in at least one direction at shrink activating temperatures to produce a product-conforming package.

As stated, the top ply is clear, non-fogging, palpable and elastic, in addition to having a high oxygen transmission rate subsequent to complete formation of the package. Thus, the fresh red meat color can be maintained in the package; the meat color can be readily seen because of the clear, non-fogging character of the film; the meat quality and texture can be felt because of the film palpability; and any temporary film deformation due to handling will be eliminated due to the film's elastic character.

Essential characteristics of bag utilization are easy opening, bag to bag separation, (that is, elimination of one bag sticking to another) and product conformity at shrink activating temperature. It is preferred that both surfaces of the bottom ply be nonblocking to the top ply as hereinafter described. This results not only in easy opening of the bag so that the product can be readily introduced therein, but also results in easy bag to bag separation so that manual or mechanical means may be employed to obtain individual bags from a supply stock. Also, the nonblocking character of the bottom ply prevents packages of fresh red meat from sticking to each other when such packages are stacked in retail display cases. Also preferred is that the bottom ply have a degree of shrink in either a single direction or in both directions so that when a bag large enough for ready insertion of the product is made and the product is inserted, package conformity is obtained by subjecting either the bottom ply or the entire package to shrink activating temperatures. It has been found that shrinkage of at least 10 percent in either or both directions is sufficient for most products. Shrink character is readily imparted to the film ply by unidirectional or bidirectional orientation by methods readily apparent to the skilled artisan.

As has been stated above, it is desirable that packages embodying the invention conform closely to the packaged article. Such conformance can be achieved in a number of ways. For example, the bag may be somewhat smaller than the product to be packaged and stretched over the article. In this case, one ply of the bag may be more elastic than the other. Or the bag may be larger than a product to be packaged and one or both plies be shrinkable. As indicated, a preferred bag utilizes a heat shrinkable bottom ply with a top ply which is substantially dimensionally stable to shrinkage under the heat shrinking conditions of the bottom ply.

Since the minimum oxygen transmission rate needed to retain the fresh red meat color is critical (at least about 140 cc./100 sq.in./24 hrs./atm. at 32° F.), it is essential that the top ply retain its permeable character after product-conforming packaging of the product. Shrinkage of film results in increase in thickness which in turn reduces the passage of oxygen therethrough. Stretching the film decreases thickness and results in increased oxygen transmission. Thus, if the oxygen transmitting film is dimensionally stable, then such a film having the minimum rate can be used. However, if the film is to be stretched it can have a lower initial rate. If it is to be shrunk it must have a higher initial rate.

In forming packages as described herein the change in dimension of the oxygen transmitting film can be as much as 25 percent. Such dimensional changes will require appropriate adjustment in the initial oxygen transmission rate of the film employed. Therefore, it is preferred that the shrink be obtained by change in dimension of the bottom ply.

Generally to enhance the oxygen permeability of the polyvinyl chloride films utilized in the invention, the plasticizer level in the film is increased or certain select plasticizers are used. Useful plasticizers for this purpose are dibutyl sebacate, di(2 ethyl hexyl) adipate, epoxidized soybean oil and others known to the art. Also, for a given film composition, the thinner the film the greater the oxygen transmission rate.

The following examples are set forth to further illustrate and exemplify the invention and are not intended to be construed as being, in any way, limitative of the invention. The physical characteristics of the films set forth in the Tables below, were determined by the test methods set out below.

EXAMPLE I

Six polyvinyl chloride plastic films were prepared from different resin formulations. The resin formulations for each film are set forth in table I below wherein the films are identified by letters "A," "B," "C," "D," "E" and "F."

The resulting physical properties of these films are shown in Table II. The films were made by the extrusion methods and apparatus well known to those skilled in the art, such as by the dry blending and "blown" extrusion techniques and apparatus described in U.S. Pat. No. 2,876,497 to Alexander.

The films, A, B, C and E in Table II below, were first extruded as above and were then biaxially oriented by the "isolated bubble" technique and apparatus described in the U.S. Pat. application Ser. No. 733,086 to Shiner and Tijunelis. The films D and F in Table II below were not biaxially oriented.

The diatomaceous silica used in the formulations had a particle size of 4 to 2 microns and is that material sold by Johns Manville Co. under the trade name of Superfloss. The term "HTSA" denotes a commercially obtained, high temperature slip agent whose major component is a nitrogeneous organic compound.

TABLE I

Resin Formulations (parts/100 parts resin)

| Component | Film A | Film B | Film C | Film D | Film E | Film F |
|---|---|---|---|---|---|---|
| Resin: | | | | | | |
| Polyvinyl chloride homopolymer (inherent viscosity, 0.8–1.4) | 100 | 100 | 100 | 100 | 100 | 100 |
| Plasticizers: | | | | | | |
| Dibutyl sebacate | 2 | 28 | Nil | Nil | 31 | Nil |
| di(2 ethyl hexyl) adipate | Nil | 21 | 21 | 30 | Nil | 32 |
| epoxidized soybean oil | 5 | 7 | 7 | 7 | 7 | 12 |
| Stabilizers: | | | | | | |
| Organometallic type (Ca—Zn) | 2.5 | 3.75 | 3.75 | 2.5 | 2.5 | 2.5 |
| Antifog Additive: | | | | | | |
| Sorbitan monostearate | 2.0 | Nil | Nil | 2.0 | 1.0 | 2.0 |
| polyoxyethylene sorbitan monooleate | 2.0 | Nil | Nil | 2.0 | 1.0 | 2.0 |
| Slip and Antiblocking Agents: | | | | | | |
| "HTSA" | Nil | Nil | 0.25 | Nil | Nil | Nil |
| diatomaceous silica | Nil | 1.0 | Nil | Nil | Nil | Nil |
| ethylene bis stearmide | 0.5 | 0.75 | 1.0 | 0.5 | 0.5 | 0.5 |
| Other Additive: | | | | | | |
| stearic acid | 0.2 | Nil | Nil | 0.2 | Nil | 0.2 |

TABLE II.—PHYSICAL PROPERTIES OF FILMS

| Property | Film | | | | | |
|---|---|---|---|---|---|---|
| | A | B | C | D | E | F |
| Haze, percent | 7 | Opaque | 4 | 1 | 3 | 6 |
| Shrinkage (at 90° C.), percent: | | | | | | |
| MD | 28 | 40 | 33 | 7 | 34 | 9 |
| TD | 17 | 40 | 29 | 0 | 26 | −*6 |
| Shrinkage (at 70° C.), percent: | | | | | | |
| MD | 21 | 19 | 25 | 5 | 21 | 4 |
| TD | 6 | 72 | 96 | 0 | 7 | −*5 |
| Stress at 10 percent elongation (p.s.i.): | | | | | | |
| MD | 2,850 | 3,300 | 3,800 | 620 | 1,150 | 490 |
| TD | 1,540 | 2,800 | 2,700 | 540 | 930 | 500 |
| Thickness (average in mils) | 0.7 | 1.0 | 0.9 | 0.7 | 0.7 | 0.7 |
| Oxygen transmission rate at 32° F. in cc./100 sq. in./24 hrs./atm | 175 | 40 | 45 | 200 | 290 | 360 |

*Film expanded.

EXAMPLE II

Certain film combinations were tested for blocking character by the method set forth below. The results of the blocking tests are set out in Table III.

Also, the films obtained from Example I above were formed into bags from different film combinations as shown in Table IV. The bags were tested for ease of opening by an air blast by the test method set forth below. The bags were formed by placing one ply of film on top of another and heat sealing them together around three sides of their superimposed perimeters. Each film employed as the top ply measured 8 inches × 4 inches, while each film employed as the bottom ply measured 10 inches × 4 inches. The added length of the bottom ply was provided to form an extension or lip to provide a mechanical structure of the bag to facilitate easy opening of the mouth of the bags.

TABLE III

Blocking Characteristics of Films

| Film Ply Combinations | | Amount of Blocking (gm./in.) |
|---|---|---|
| Top Film Ply | Bottom Film Ply | |
| A | B | 0.2 |
| D | B | 2.7 |
| A | C | 5.0 |
| D | D | 6.3 |

TABLE IV

Air Blast Opening of Bags Formed From Different Film Ply Combinations

Bag Construction
Film Ply Combinations

| Top Ply (8" × 4") | Bottom Ply (10" × 4") | Distance at which bag Opened in 5 Seconds (in.) |
|---|---|---|
| A | A | |
| D | D | |
| E | E | Did not open even at 5 in. |
| F | F | |
| A | C | |
| A | B | |
| D | B | |
| E | B | Opened at 25 in. |
| F | B | |
| C | C | Opened at 10 in. |

It is important that the composite film bags of the invention be capable of being readily and quickly opened. Hence, the top and bottom plies comprising the bag should not adhere to each other; that is, block to an extent where they can not be opened by means commonly used.

As shown in Table IV, the bags made from the combination of films (A and B) and the combination of films (D and B), (E and B), and (F and B) have the property of being readily opened by an air blast.

In addition, from the results set forth in Table II above, it can be seen that films, A, D, E and F exhibit those properties of haze and initial oxygen transmission rate which render them useful as the top ply for the composite bag of the invention while film B exhibits those properties of haze and shrink which renders it useful as the bottom ply.

Furthermore, the relative absence of shrinkage in films D and F, and low shrinkage of film E with retention of a high oxygen transmission rate; coupled with the nonblocking and relatively high shrinkage of film B, affords combinations of construction into composite bags of films (D and B), (E and B), and (F and B) any of which are capable of conforming to a fresh meat item packaged therein.

From the results set forth in Table III above, it can be seen that film A or film D in combination with film B, which contains an inert, granular, anti-blocking agent (diatomaceous silica), exhibits less blocking than film A in combination with film C, which contains slip agents (HTSA and ethylene bis stearamide).

It is interesting to note the blocking characteristics which plies of these films exhibit to themselves. The blocking characteristics for films A, B, C, D, E and F to themselves, were determined in the same manner as for Table III above. The blocking characteristic for one ply of film A to another ply of film A, was found to be 6.3 gm.in.; for film B, 0 gm./in.; for film C, 1.0 gm./in.; for film D, 6.3 gm./in. The blocking characteristics of films E and F were found to be of the same order as film D.

Although the nonblocking character of the film used as the bottom ply was obtained by the use of diatomaceous silica, it is to be understood that other methods of imparting nonblocking character to a film can be used. Low levels of plasticization, generally produce firm, stiff or semi-rigid films which also tend to have improved anti-blocking character.

It should be appreciated that while the results set forth in Table IV above primarily reveal the ease of opening and the nonblocking and slip characteristics which the film plies exhibit toward each other, other intangible factors will also affect the ease with which the composite bags can be opened. As is known to those skilled in the art, these intangible factors include, but are not limited to, such characteristics and properties as the relative degree of pliancy between the top and bottom plies, the electrostatic attraction between the top and the bottom plies, the pliancy and/or softness of the top ply, the relative film thicknesses of the plies, and the like.

EXAMPLE III

The shelf life of various types of fresh red meats was determined when packaged in composite bags of the invention and compared to the same types of fresh red meats overwrapped and packaged in a commercially obtained plastic film produced from a polyvinyl chloride resin and which film is available under the trade designation "Avisco PVC M-10." Shelf life was determined by a visual inspection of the packaged meats. When 10 percent of the visible surface of the packaged fresh meats turned brown, the shelf life of the meat was considered to be ended. All the packages except the overwrapped commercial film were subjected to heat in a standard shrink tunnel to produce product-conforming packages. The results are shown in Table V.

Although there is some variation in the shelf life exhibited by various types and cuts of fresh meats, it was found that the shelf life of fresh meats packaged in the composite bags of the invention was comparable to and, in many instances, somewhat better than that of those packaged in the commercially obtained film.

TABLE V.—SHELF LIFE OF VARIOUS PACKAGED MEAT CUTS

| Package made with indicated film plies, top/bottom | Oxygen transmission at 32° F. of top film ply | | Color shelf life (days) | | | |
|---|---|---|---|---|---|---|
| | As is | Estimated post shrinkage | Tender-loin steak | Face of rump | Blade steak | Rump steak |
| A/B | 175 | 90 | 2 | 4 | 2 | 5–6 |
| D/B | 200 | 185 | 4–5 | 8–9 | 7–8 | 8 |
| Commercial polyvinyl chloride stretch overwrap | 180 | a180 | 3–4 | 8 | 7 | 7 |
| E/B | 290 | 145–220 | (b) | 7–8 | (b) | >9 |
| F/B | 360 | 350 | 4–5 | 8–9 | 7–8 | 8 | a No shrink.  b No test.

It is to be noted as shown in Table V, that the oxygen transmission rate through the film after packaging is critical. The biaxially oriented shrinkable top films A and E both had initial oxygen transmission rates to indicate good storage capabilities. However, top film A had a post shrinkage oxygen permeability below that desired thus resulting in a shorter shelf life of the package. Film E, also a biaxially oriented film, retained sufficient oxygen permeability after shrinkage to provide good shelf life for the product. Films D and F were dimensionally stable to the shrink temperatures employed and retained their high level of oxygen permeability after packaging.

In lieu of pre-fabricating individual, composite bags as shown in FIG. 1 of the drawing, the top and bottom film plies can be provided in kit form as part of a packaging system comprised of separate plies on a single roll or individual rolls of each ply; interleaved plies in sheet form or partially preformed structural packaging plies.

Figure 2:
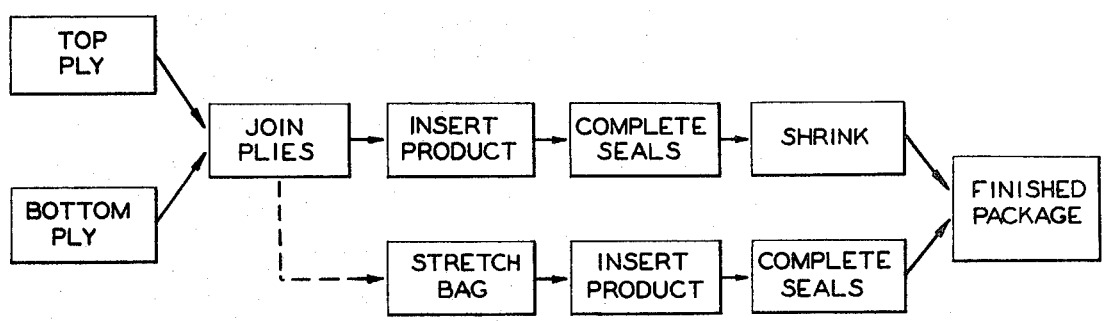
FIG. 2 is a flow diagram showing steps in the production of a package embodying the invention.

As indicated in FIG. 2, these systems generally comprise the steps of providing a kit of two plies of film and joining them together. If a shrink film is used as the bottom ply, as shown generally in FIG. 2, the product is first inserted between the film plies, the seals are completed, and then shrinking is accomplished. If the film used is stretchable, as shown generally an FIG. 2, it is stretched so that the product can be inserted, and then seals are completed about the product to envelope it in the film.

As one embodiment of the kit for forming the packages according to the systems shown in FIG. 2, the top and bottom film plies can be provided from separate roll stocks. As the films are unreeled, they are superimposed one over the other and, the longitudinal edge of one film can be joined to the longitudinal edge of the other. Fresh meats can then be inserted between the film plies at their open, longitudinal edges and the opened longitudinal edges joined together. Subsequently the film plies can be joined to each other transversely between each inserted fresh red meat item and then severed to provide individually packaged fresh red meat items.

As an alternate embodiment of the kit for forming the packages, the longitudinal edges of the top and bottom film plies can be similarly joined together followed by joining the film plies together transversely at predetermined intervals to form a plurality of consecutive, connected pouches. These pouches or bags in tandem can be fed from reel stock to the packaging station. After fresh meat items have been inserted into the thusly formed pouches, the open edges of the film plies can be joined together. The pouches containing the fresh meat items can then be severed to provide individual, fresh meat packages. In this embodiment, as well as in the previous embodiment, the transverse joints should either be of sufficient width to provide a joint for two, adjacent pouches or the transverse joints of each adjacent pouch should be spaced apart so that severing can be accomplished therebetween without destroying the integrity of the transverse joints.

A row of perforations can also be provided between adjacent transverse joints so that the pouches can be severed from each other merely by pulling them apart at the perforations.

Although the composite bag of the invention has been described and illustrated as being fabricated from a single top ply and a single bottom ply, it should be understood that these plies are considered the walls of the bag and either of each plies can consist of two or more films such as in the form of a laminate.

As has been described hereinabove, the bottom ply can be produced to have distinguishing optical properties, such as by incorporating a pigment in the resin formulation so that it is clearly and easily recognizable as the bottom ply. Distinguishing optical characteristics can serve to quickly determine which is the top and which is the bottom of the composite bags so that when the bags are stacked for filling, a nonblocking bottom ply can be placed to always separate two top plies from each other thereby preventing them from sticking to each other and facilitating their removal from each other. After the composite bags have had a fresh meat item packaged in them, they can be prevented from sticking to each other when placed in a display case for retail by stacking them in the same manner.

Other examples of combinations of films which can be employed as the top and bottom plies of the composite bag are polyvinyl chloride-polyethylene; polyvinyl chloride-ethylene vinyl acetate; and the like. Preferably the films are heat sealed. In the embodiment wherein it is difficult to heat seal the two plies together, they can be joined together by any suitable means, such as by use of an appropriate adhesive.

Hence, it is to be understood that various film ply combinations can be utilized, in addition to those described and discussed above, to fabricate the composite bag of the invention.

Since the composite bags of the invention are fabricated from pre-selected plastic films which are intrinsically non-blocking to each other, the use of external, mobile anti-block additives such as powders, silica gels, starches and the like are not needed thereby avoiding unnecessary addition of substances on the surfaces of the films comprising the composite bags which might tend to promote bacterial growth or interfere with the clarity and oxygen transmission rate of the top ply.

The physical characteristics of the films set forth in the above Tables were determined by the following test methods:

*Haze* according to A.S.T.M. method D–1003–52.

*Elongation* and *Stress* according to A.S.T.M. method D–638–58T.

*Oxygen Transmission Rate* according to A.S.T.M. method D–1434–63.

In testing film samples of the type described for oxygen permeability, there is some variation, sometimes as much as 10–15 percent, in the test results from sample to sample of film obtained from adjacent portions of the ply. Slight differences in thickness, temperature, pressure, and in other variables account for the variation in results of "duplicate" samples tested.

SHRINKAGE

Shrinkage was determined by immersing samples of each film measuring about 1¼ inches × 1 centimeter in a water bath maintained at the indicated temperature for a period of about 5 seconds and then measuring the dimensional change in the longitudinal direction of each of the film samples. The letters "MD" and "TD" denote machine direction and transverse direction, respectively.

BLOCKING

The blocking characteristics of the films were determined by the following method:

Samples of each film measuring 2 inches × 5 inches were obtained and the plies in each set of film ply combination to be tested were first superimposed on each other, separated and immediately superimposed on each other again. Each set of superimposed film ply combinations was then placed between alternate layers of heavy paper until a stack of film and paper measuring at least about one-fourth inch in height was obtained. The stack of film and paper was then placed on the padded surface of a steel plate measuring 4 inches × 4 inches × ¼ inches and another padded steel plate of the same dimension was placed on top of the stack. A 24 pound weight was then placed on the uppermost steel plate and the thusly weighted stack of paper and film was placed in an oven maintained at a temperature of about 49° C. for a period of 72 hours in order to precondition the sets of film ply combinations in the stack.

At the end of this period, the film ply combinations were removed from the oven and their blocking characteristics determined. To determine the blocking characteristics of the film ply combinations, each film ply was first secured to a platen measuring 2 inches × 4 inches × 2 inches by taping the two ends edges of the film sample to the platen. The other film sample was then similarly secured to another platen of the same dimension.

While holding the two platens pressed together so that they would not slide over each other, the upper platen was then secured to an immovable surface while the lower platen was secured in the jaws of an Instron Tensile Tester. The lower platen was then pulled away from the top platen until the superimposed film plies secured to each platen became fully separated. When the film plies became completely separated, the reading on the chart of the Instron Tensile Tester was recorded, and the blocking characteristics for the film ply combination computed from the following equation in which the results are expressed in grams per inch (gm./in.):

$$\text{Blocking} = \frac{\text{grams of force to open}}{(\text{no. of film interfaces})(\text{flat width of samples})}$$

Using the data set forth above, this equation can also be written as follows:

$$\text{Blocking} = \frac{\text{Total grams} - W}{2 \times 2} = \text{gm./in.}$$

wherein W is the weight of the upper block.

EASE OF BAG OPENING

The films obtained from the Examples, in various combinations of plies, were formed into bags and the bags were tested for ease of opening by use of an air stream.

The formed bags were then placed on a table with the top ply uppermost. The lip of the bottom ply was then secured to the table with adhesive tape so that the edges of the top plies were even with and parallel to the edge of the table. A one-quarter horsepower air blower whose intake was covered to about 75 percent of its capacity was then positioned at the same horizontal level as and facing the open ends of the bags on the table.

The blower was turned on to direct a stream of air at the open ends of the bags for periods of 5 seconds. The distance from the open ends of the bags to the face of the nozzle of the blower was initially set, in each instance, at 25 inches. If the bags did not open during the first 5 second period at this distance, the distance between the blower and the open ends of the bags was decreased 5 inches for each successive 5 second period until a distance of 5 inches was reached.

Although the invention has been described in some detail and with particularity, it should be understood that changes, modifications and alternations can be made therein, in addition to those suggested and described herein, without departing from the scope and spirit of the invention.

What is claimed is:

1. A kit suitable for forming packages for fresh red meats, said kit comprising a pair of flexible plastic films having dissimilar properties, one of said pair of films selected from the group of flexible thermoplastic films consisting of ethylene vinyl acetate and polyvinyl chloride said film being formulated so as to have a tendency to block to itself and so as to be characterized as clear, transparent, non-fogging and providing an oxygen transmission rate in a package formed from said pair of films at least about 140 cc./100 sq. in./24 hrs./atm. at 32° F., and the other of said pair of films selected from the group consisting of ethylene vinyl acetate, polyethylene and polyvinyl chloride said film being formulated so as to be nonblocking with respect to said oxygen transmitting film said pair of films being joinable by heat sealing to permit assembly of said pair of films to form a package completely enveloping red meat placed therebetween.

2. A kit as defined in claim 1 in which said oxygen transmitting film is elastic.

3. A kit as defined in claim 1 in which said nonblocking film is heat shrinkable.

4. A kit as defined in claim 3 in which said oxygen transmitting film is dimensionally stable under heat shrinking conditions for said nonblocking film.

5. The kit as defined in claim 1 where continuous lengths of said pair of films is on a single roll with said oxygen transmission and nonblocking films in alternate plies and each of said ply of film being readily separable from the other.

6. The kit as defined in claim 1 where the said films are partially pre-formed into a plurality of consecutive separably attached bags.

7. The kit as defined in claim 1 where the said films are partially pre-formed into bags.

8. A kit as defined in claim 1 where said oxygen transmitting film is a polyvinyl chloride polymer.

9. A kit as defined in claim 8 where said nonblocking film is a polyvinyl chloride polymer.

10. The kit as defined in claim 9 wherein said nonblocking film contains diatomaceous earth incorporated therein.

11. A composite plastic film bag suitable for packaging fresh red meats comprising in combination, a pair of flexible plastic films having dissimilar properties, one of said pair of films being selected from the group of flexible thermoplastic films consisting of ethylene vinyl acetate and polyvinyl chloride said film being formulated so as to be characterized as clear, transparent, non-fogging and providing an oxygen transmission rate in a package formed from said pair of films at least about 140 cc./100 sq. in./ 24 hrs./atm. at 32° F., and so as to have a tendency to block to itself and the other of said pair of films formulated so as to be nonblocking with said oxygen transmitting film, said plastic bag having an open end and formed by heat sealing superimposed plies of said pair of films.

12. A bag as defined in claim 11 in which said oxygen transmitting film is elastic.

13. The bag as defined in claim 11 wherein said nonblocking film is selected from the group of flexible, thermoplastic polymer films consisting of ethylene vinyl acetate, polyethylene and polyvinyl chloride.

14. The bag as defined in claim 11 where said nonblocking film has a portion thereof extending beyond the open end of said oxygen transmitting film.

15. A bag as defined in claim 11 in which said nonblocking film is heat shrinkable.

16. A bag as defined in claim 15 in which said oxygen transmitting film is dimensionally stable under heat shrinking conditions for said nonblocking film.

17. A bag as defined in claim 11 where said oxygen transmitting film is a polyvinyl chloride polymer.

18. A bag as defined in claim 17 where said nonblocking film is a polyvinyl chloride polymer.

19. The bag as defined in claim 18 wherein said nonblocking film contains diatomaceous earth incorporated therein.

20. A method for producing packages of red meat in plastic films including the steps of:

a. supplying a first length of clear, transparent flexible plastic film selected from the group consisting of ethylene vinyl acetate and polyvinyl chloride characterized in that it is formulated to be non-fogging, to have a tendency to block itself and to provide an oxygen transmission at 32° F. of at least about 140 cc./100 sq. in./ 24 hrs./atm. in such packages;

b. supplying a second length of flexible plastic film, said film being formulated so as to be nonblocking to said first length of plastic film;

c. superimposing said first and second lengths of plastic film to each other at least marginally;

d. inserting a red meat item between the superimposed lengths of plastic film; and e. forming seals between the first and second lengths of plastic film such that the red meat item is enveloped therebetween.

21. The method of claim 20 wherein the first and second lengths of plastic film are supplied from a common source, said first and second lengths of plastic film being readily separable into individual plies of film.

22. The method of claim 21 wherein, the longitudinal edge of one length of plastic film is joined to the longitudinal edge of the other length of plastic film.

23. The method of claim 22 wherein the thusly joined lengths of plastic film are joined together transversely at spaced apart intervals to define a plurality of consecutively connected pouches.

24. A packaged fresh red meat item packaged in a composite flexible plastic film bag, said composite plastic film bag comprising a first ply of plastic film that is substantially dimensionally stable to heat shrinkage selected from the group of ethylene vinyl acetate and polyvinyl chloride said film being formulated so as to have a tendency to block itself and so as to be characterized as clear, transparent, non-fogging and has a oxygen transmission at 32° F. of at least about 140 cc./100 sq. in./24 hrs./atm. and the second ply of plastic film formulated so as to be characterized as nonblocking to the first ply of plastic film, said first ply and second ply of plastic film being sealed together and completely enveloping the fresh meat item packaged therebetween.

25. The packaged fresh meat item as defined by claim 24 wherein said second plastic film ply of said composite plastic film bag is a flexible, thermoplastic polymeric film selected from the group consisting of ethylene vinyl acetate, polyethylene and polyvinyl chloride.

26. The packaged fresh red meat item as defined by claim 26 in which both of said film plies are composed of a polyvinyl chloride polymer.

* * * * *